(No Model.)

O. MURISIER & P. C. GILCHRIST.
OPEN HEARTH FURNACE FOR IRON AND STEEL.

No. 330,415. Patented Nov. 17, 1885.

United States Patent Office.

OSCAR MURISIER, OF ALEXANDROWSKY, ST. PETERSBURG, RUSSIA, AND PERCY CARLYLE GILCHRIST, OF PALACE CHAMBERS, WESTMINSTER, ENGLAND; SAID MURISIER ASSIGNOR TO SAID GILCHRIST.

OPEN-HEARTH FURNACE FOR IRON AND STEEL.

SPECIFICATION forming part of Letters Patent No. 330,415, dated November 17, 1885.

Application filed March 24, 1884. Renewed October 19, 1885. Serial No. 180,347. (No model.)

*To all whom it may concern:*

Be it known that we, OSCAR MURISIER, a citizen of the Swiss Republic, residing at Alexandrowsky, near St. Petersburg, Russia, and PERCY CARLYLE GILCHRIST, a subject of Her Majesty the Queen of Great Britain, residing at Palace Chambers, Westminster, England, have invented certain new and useful Improvements in Open-Hearth Furnaces for Iron and Steel, of which the following is a specification, reference being had to the accompanying drawings, forming part thereof.

Our invention relates to improvements in the art of constructing Siemens or other open-hearth furnaces employed in the manufacture and simultaneous dephosphorization of steel or ingot-iron by the basic process, and also to linings adapted for use therein.

It has been heretofore proposed to build Siemens furnaces having a silica roof and a basic hearth, and it has been also proposed to build roofs of basic bricks formed by exposing raw dolomite to an intense heat for a long time. Both these methods, however, have hitherto failed to give satisfactory results in practice, the first on account of the great difficulty experienced in separating the acid parts of the furnace from the basic hearth and basic additions added, which are added to the molten metal; the second on account of the almost insurmountable difficulty of building a furnace with the roof of basic bricks, manufactured as above described, on account of the great irregularity in shape of the bricks so produced, in consequence of the great shrinkage they undergo in firing, amounting generally to fifty per cent of their volume. By our present invention we have been enabled to overcome these difficulties and to construct a furnace having not only a basic hearth and sides, but also a basic port and basic roof.

Figure 2:
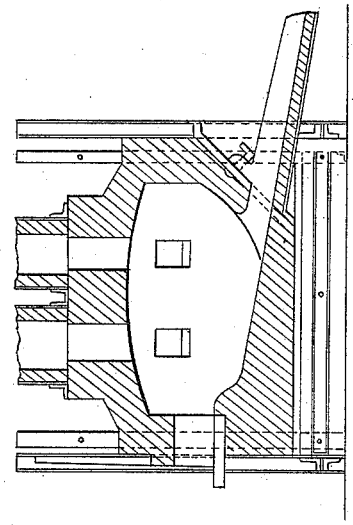
Figure 1:
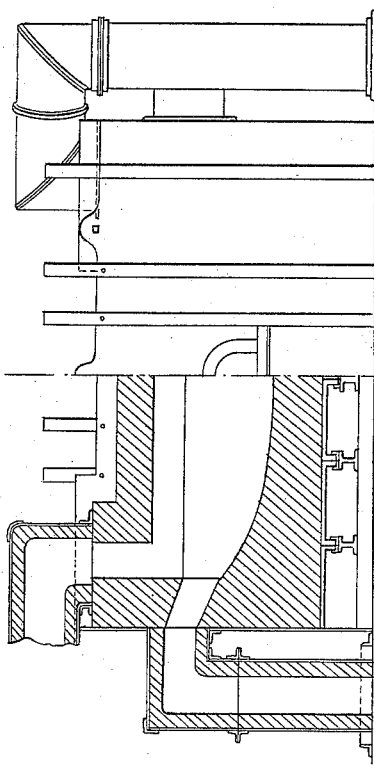
Figure 3:
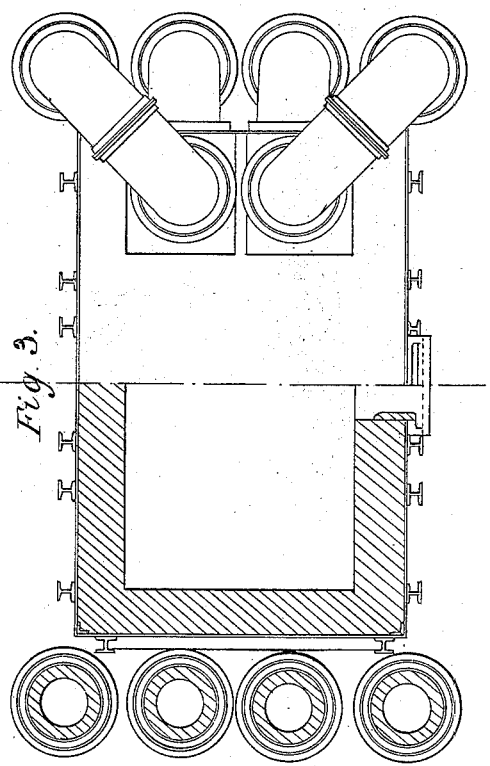

In the accompanying drawings, which form part of this specification, Figure 1 represents a side elevation, partially in section; Fig. 2, an end elevation, also in section; and Fig. 3, a plan partially in section.

According to our invention, we construct the furnace either in the usual Siemens form, or in the form shown in Fig. 1. In either case provision is made for heating the chambers to a red or higher temperature without passing any of the products of combustion through the furnace. This may readily be done by causing the gases to pass through a passage leading to a flue. The hearth of the furnace is lined either with rammed basic material or with basic bricks made in the following manner: Dolomite, containing not too great a percentage of silica, is fired at an intense white heat in a cupola furnished with blast, and in which coke is generally used as fuel, but gas may be employed to replace the whole or part of the coke employed. The dolomite, after burning, is ground to a convenient size, and mixed with about ten per cent, by volume, of boiled tar. The resulting mixture is then rammed into cast or wrought iron molds, made in two or more parts, and furnished with a tightly-fitting cover. The molds, when full, are covered up and placed in a stove, where they are heated to a dull-red heat for some six hours. The volatile part of the tar is thus driven off, and a hard true brick kept together by the carbon of the tar is the result. These bricks, which are perfectly black in color, are so true that no cement whatever is needed in setting them. They should be used within a fortnight after their production. The sides, the ports, and the roof of the furnace we construct entirely of these coked bricks, which we make in molds of different shapes, to fit easily into the position they are required to take in the furnace. The air and gas passages leading to the ports may also be constructed of these coked bricks for some distance below the ports, the bricks being cased with iron plates and supported independently by iron standards resting on the ground. So soon as the furnace is built, the air and gas from the chambers previously heated, as described, are passed into the furnace, which is thus brought up to a high heat in a very short time—six to twelve hours. The action of said heat sets the basic material and prevents it crumbling. It is well before thus passing gas and air into the furnace to fill it full of coke. This gives a good glaze to the furnace-lining, and keeps a reducing atmosphere up to and until a setting-heat is produced. It is desirable, after having thus brought the furnace up to a very high heat, to anneal it by letting the temperature fall. This process of annealing may sometimes be repeated with advantage more than once.

A mixture of lime (preferably highly burned and shrunk magnesian lime) and tar, or tar and creosote, has been heretofore molded into bricks, and then, when shaped, burned for use as furnace-linings, and a mass of such material has been applied—like ganister—in a furnace and fired; but we are not aware that the burning of the bricks has been effected in iron molds under pressure, so as to retain the shape of the bricks and adapt them for roofs and linings without truing with similar cement. Furthermore, we are aware of the production of a light-colored brick or lining, free from carbonic acid and water, by mixing burned limestone, dolomite, or magnesia, and a binding material—such as chlorides or alkalies—then burning the same, afterward comminuting it and mixing it with tar, and finally burning it. The mass may be molded under pressure after the admixture with tar; but such mass does not give perfectly black and glazed brick, aside from its constitutional difference from our invention.

Having thus fully described the nature of our said invention, what we claim, and desire to secure by Letters Patent, is—

1. The improvement in the art of constructing metallurgic furnaces, the same consisting in forming the hearth, sides, roof, and ports of basic material composed of calcined, shrunk, and fritted lime mixed with tar and subjected to pressure in molds, and to heat to volatilize the tar, and then to a coking-heat, all while in the molds, and finally annealing the same, in the manner and for the purpose set forth.

2. Material for lining metallurgic furnaces, consisting of compressed and molded calcined, shrunk, and fritted lime mixed with tar, and afterward coked, and thereby rendered hard and black, substantially as described.

3. The process of forming lining-bricks for furnaces, the same consisting in pressing calcined, shrunk, and fritted lime mixed with tar into iron molds, then driving off the volatile matter of the tar and coking the bricks with the molds covered, as described.

OSCAR MURISIER.
PERCY CARLYLE GILCHRIST.

Witnesses to the signature of the said Oscar Murisier:
ARMAND AMEDEE,
MAURICE DUFOUR.

Witnesses to the signatures of the said Percy Carlyle Gilchrist:
PHILIP M. JUSTICE,
ALLEN P. JONES.